June 4, 1929.  T. C. JOHNSON  1,715,841
TRACTOR WHEEL ATTACHMENT
Filed Feb. 24, 1928
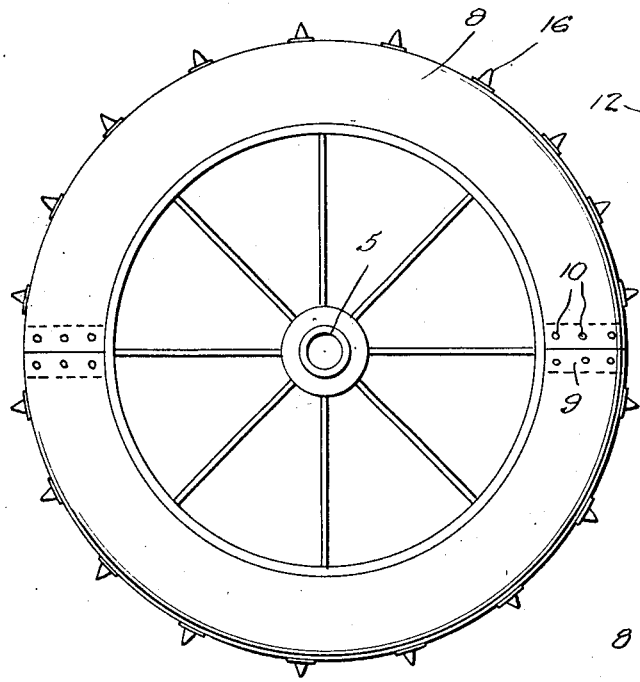
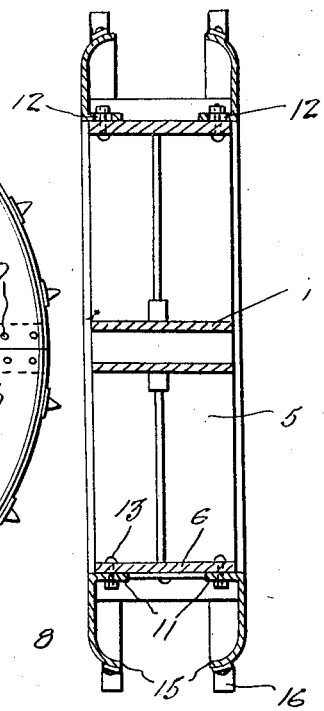
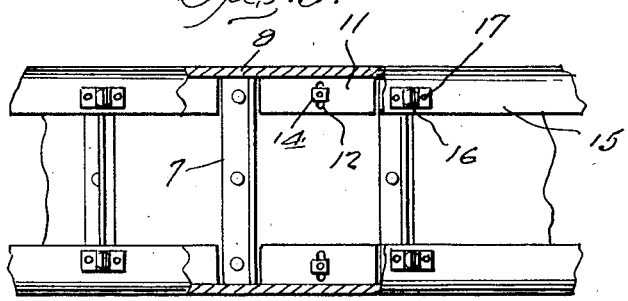
Inventor
T. C. Johnson
By Clarence A. O'Brien
Attorney Patented June 4, 1929.

1,715,841

UNITED STATES PATENT OFFICE.

THEODORE C. JOHNSON, OF LEXINGTON, NEBRASKA.

TRACTOR-WHEEL ATTACHMENT.

Application filed February 24, 1928. Serial No. 256,744.

The present invention relates to attachments for tractor wheels and has for its principal object to provide a pair of wheel extensions fitted circumferentially about the wheels at the opposite edges thereof whereby to elevate the rim of the tractor wheel above the surface of the ground over which the same is passing and to permit the wheel to straddle the rows of young corn while working the field.

A further object of the invention is to provide means for adjustably mounting the extensions at each edge of the tractor wheel permitting the same to be spaced apart a suitable distance so as to enable the extensions to travel within adjacent ditches at opposite sides of a row of corn.

By providing extensions of the wheel adapted to straddle the row of corn, with the respective extensions at each edge of the wheel arranged to travel in separate ditches at the opposite sides of a corn hill, the tractor may be driven over the field so that the corn row operates to guide the wheel, thus assisting the operator in steering the tractor and enabling him to devote more attention to the cultivating or tilling tools which are drawn at the rear of the tractor.

A still further object is to provide a wheel attachment of this character of a simple and practical construction, which may be easily and quickly secured in position on the wheel, which is strong and durable, inexpensive to manufacture and otherwise well adapted to the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view of a tractor wheel equipped with extensions constructed in accordance with my invention, Figure 2 is a vertical transverse sectional view therethrough, and Figure 3 is a fragmentary plan view with parts broken away and shown in section illustrating the manner in which the flange extension is secured between the cleats of the tractor wheel and also the means providing adjustment of the extension with respect to each other.

Referring now to the drawing in detail, I have illustrated my invention adapted for use upon a tractor wheel 5 of conventional construction, including a relatively broad wheel rim 6 and upon the outer periphery of which transversely extending cleats 7 are secured.

My invention comprises a pair of sectional extensions 8 arranged circumferentially about the outer periphery of the wheel and at the opposite edges thereof, said extensions being arranged in spaced relation with respect to each other and adapted to materially increase the circumference of the wheel by raising the rim 6 thereof out of contact with the ground.

The extensions 8 may be formed of any desirable number of circumferentially connected sections, the present embodiment illustrating the extension as constructed of a pair of semi-circular sections as shown in Figure 1 of the drawing, the abutting ends of said sections being secured by a plate 9 overlapping the respective ends of the section and secured thereto by means of rivets, bolts or the like 10. The inner periphery of the extension is formed in an inturned flange 11, sections of the flange being cut out at regular intervals to accommodate the cleats 7 carried on the rim of the wheel, each section of the flange disposed between the cleats being provided with a transverse slotted opening 12 through which bolts 13 carried by the rim may be inserted, to one end of which a nut 14 is carried for firmly attaching the flanges of the extension to the rim of the wheel.

The outer periphery of the extensions 8 are curved toward each other in a slightly arcuate formation as shown at 15 whereby to increase the area of the extension engaging the surface of the ground.

Upon the outer surface of the curved end 15 of the extension are arranged a series of traction increasing lugs 16, secured to the extensions by attaching plates 17, said lugs having a relatively broad head extending transversely of the wheel, as shown in Fig. 2 of the drawing with the outer corner or edge of each lug slightly longer than the inner edge thereof to compensate for the curvature of the end 15 of the extension so that the ground engaging edge of the lug will be disposed at a horizontal plane.

By providing an extension 8 for each edge of the tractor wheel and spacing the same a substantial distance apart, the wheel may thus straddle a row of young growing corn so that the extensions will travel in the ditches at the opposite sides of the corn, the corn hill thus assisting in guiding the wheel and thereby facilitating the steering of the tractor across the field.

The transversely disposed slotted openings 12 formed in the flanges 11 of the extensions enable the same to be adjusted with respect to each other so as to provide sufficient space between the extensions for the passing therebetween of the growing corn without injury.

As indicated in Figure 2 of the drawing the extension 8 may be adjusted so as to be carried outwardly beyond the side edges of the rim 6 of the wheel.

The cut out portion of the flanges 11 may be formed at an angle so as to enable the sections of the flanges to fit between diagonally disposed cleats carried by the wheel rim, when the tractor is equipped with cleats of this type.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

The combination with the rim of a tractor wheel having transversely extending traction cleats thereon, of a pair of annular rim extensions positioned on the rim adjacent to the edges thereof and having laterally inwardly extending flanges formed on their inner edges, said flanges having cut out portions adapted to receive said cleats and having transverse slots in which are received bolts carried by the wheel rim, whereby said annular rim extensions are secured to the wheel adjustable transversely thereof.

In testimony whereof I affix my signature.

THEODORE C. JOHNSON.